United States Patent [19]
Wetherell

[11] Patent Number: 5,157,063
[45] Date of Patent: Oct. 20, 1992

[54] ELASTIC MODELING PASTE

[76] Inventor: Joseph J. Wetherell, 1045 Gulf of Mexico Dr., Longboat Key, Fla. 34228

[21] Appl. No.: 796,086

[22] Filed: Nov. 21, 1991

[51] Int. Cl.$^5$ .............................................. C08L 5/00
[52] U.S. Cl. ........................................ 524/55; 524/56; 524/503
[58] Field of Search ............................ 524/55, 56, 503; 523/218

[56] References Cited

U.S. PATENT DOCUMENTS

| | | | |
|---|---|---|---|
| 3,167,440 | 1/1965 | McVicker | 106/150 |
| 3,384,498 | 5/1968 | Ahrabi | 106/38.5 |
| 3,565,815 | 2/1971 | Christy | 252/301.3 |
| 4,060,421 | 11/1977 | Yoshikawa | 106/38.5 D |
| 4,242,239 | 12/1980 | Kessler | 260/9 |
| 4,336,145 | 6/1982 | Briscoe | 524/55 |
| 4,369,284 | 1/1983 | Chen | 524/476 |
| 4,386,964 | 6/1983 | Herbert | 106/150 |
| 4,618,213 | 10/1986 | Chen | 350/96.34 |
| 4,784,812 | 11/1988 | Saitoh | 264/63 |
| 5,080,717 | 1/1992 | Young | 106/197.1 |

Primary Examiner—Paul R. Michl
Assistant Examiner—LaVonda R. DeWitt

[57] ABSTRACT

The present invention relates to a modeling paste intended particularly for children, characterized by the fact that it consists of expanded polystyrene beads, said beads being uniformly immersed in a synthetic resin which constitutes a binder, by the fact that said paste does not flow, and by the fact that it has sufficient elasticity to provide suitable rebound when used as a ball. It also relates to a process for manufacturing said paste.

11 Claims, 1 Drawing Sheet

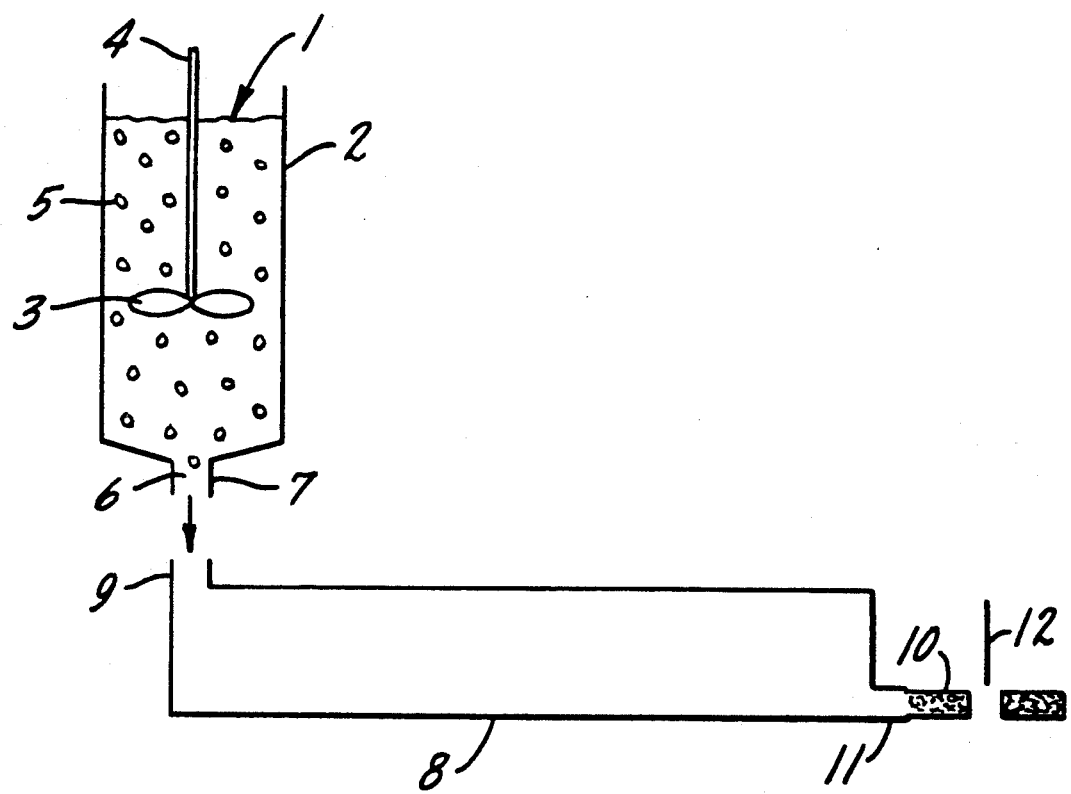

ELASTIC MODELING PASTE

SUMMARY OF THE INVENTION

The present invention relates to a modeling paste intended more particularly for children, given its game-related nature.

It also relates to a process for manufacturing said paste and a device for implementation of the process.

"Modeling pastes" are already known and are essentially intended to be used in a determined form by children, so that they can represent characters and/or objects. These pastes are made of products of mineral origin, e.g., from clays or products derived from clays or else products of plan origin of the cross-linked starch type.

However, these modeling pastes are generally not elastic or only slightly elastic.

In contrast, the present invention proposes a modeling paste which is consequently very malleable and which can be deformed by simple pressure. It also does not flow, which allows one to model any sort of figurines or objects which keep the shape they are given. It also has excellent rebound qualities (that is to say excellent elastic properties) and consequently can also serve as a ball.

The invention therefore relates to a modeling paste intended particularly for children, characterized by the fact that it consists of expanded polystyrene beads, said beads being uniformly immersed in a synthetic resin which constitutes a binder, by the fact that said paste does not flow, and by the fact that it has sufficient elasticity to provide suitable rebound when used as a ball.

This paste according to the invention is completely unusual because it is also light and flexible because of its structure.

Other advantages of the invention are as follows: The materials used in the formulation of the modeling paste are nontoxic to humans.

Because of its water soluble characteristics, the paste will dissolve into small particles of polystyrene beads if accidentally ingested.

The modeling paste of this invention will remain moist and usable for a relatively long period of time, at least in comparison to modeling pastes made of products of mineral origin or cross-linked starch products.

The modeling paste can be more easily reconstituted to its original consistency if it dries out by adding a small amount of a moisturizing lotion of the type sold under the trademark LUBRIDERM or a water soluble gel of the type sold under the trademark K-Y jelly will also add a preservative to retard bacteria growth.

The modeling paste of this invention can also be used to create permanent objects as well as temporary reusable objects. For example, because of its light weight, large and complicated products can be constructed which will not collapse of their own weight. The surfaces of objects made with the modeling paste of this invention become stronger as the paste air dries. Also, because of its strength, thin sections of material can be formed from the paste of this invention for such objects as imitation flower petals. Such objects, even when in thin sections, will have minimum shrinkage when dried. Further, the ability of the expanded styrene beads to compress slightly and the characteristic of the dried polyvinyl alcohol film to shrink very little will be helpful.

It is very easy and practical to make objects and insert accessory pieces such as imitation eyes, arms and legs, jewels, feathers, pin backs, earring clips, etc., into the moist modeling paste. The modeling paste will attach itself to almost any foreign object if allowed to fully dry. Further, the ability of the modeling paste of this invention to adhere to most materials and exhibit minimum shrinkage when dried will allow materials to be used as armatures to minimize the amount of modeling paste which must be used. Because the modeling paste of this invention sticks very easily to itself, it is practical to construct objects of different color modeling paste. Also, the modeling paste of this invention can be reinforced by the use of cloth or wire or plastic screening. Additionally, bright colors can be added to the modeling paste of this invention using nontoxic colors.

Because of the extreme malleability of the modeling paste of this invention, it can easily be extruded into a variety of shapes which will not ooze or change its form; however, it can also be easily pressed into molds, especially molds made of polyethylene since the material of the modeling paste of this invention will not stick to polyethylene.

The modeling paste can also be easily cleaned up since it sticks to itself perhaps better than to anything else.

Other objects ca be found in the following specification, claims and drawings.

BRIEF DESCRIPTION OF THE DRAWING

A method for manufacturing the modeling paste of this invention is shown diagrammatically in the drawing.

DESCRIPTION OF THE PREFERRED EMBODIMENT

The binder preferably consists of a synthetic resin which forms a sort of solid gel, which can be deformed and which is capable of keeping the shape produced under the effect of pressure (e.g. manual modeling). Thus, in a general way, it must not flow, that is to say in other words, that it does not deform under the effect of its own weight.

The nature of these binders is well known, and the invention is not limited to one particular chemical family of these binders.

It has been found, nevertheless, that it is absolutely advantageous to use a hydrophilic solid gel based particularly on a gum such as, e.g., a polysaccharide gum (such as xanthan gum or gelatin).

The gum is preferably combined with other additives which improve the consistency of the gel and its plasticity.

Thus, it is advantageous to combine with it one or more polyvinyl bases allowing one to improve the rigidity. As a polyvinyl base, one can mention, e.g., polyvinyl alcohol or polyvinyl acetate. These bases can be advantageously cross-linked by borax, that is to say sodium borate, or by equivalent compounds hereafter imprecisely called borax and which have the capacity to crosslink the polyvinyl alcohol. Preferably, one uses a combination of polyvinyl alcohol and polyvinyl acetate in a weight ratio between 1 and 16. Such combinations are herein-after referred to as PVAs.

Vinyl bases exist in numerous forms depending on the level of polymerization; it is therefore appropriate to adapt the borax content to the PVAs used.

The binder according to the invention also has a plasticizer which can be glycerin and a preservative such as propylparaben.

The expanded polystyrene beads used for the production of the paste according to the invention are well known. These beads are obtained from very fine granules of a polystyrene containing a gas. These granules are subjected to a high temperature steam jet, and under the effect of the heat, the gas expands and expands the beads. The time of heating the granules is adjusted so as to obtain the desired size. Preferably, the diameter of these beads is between approximately 1 mm and 2 mm; these sizes are particularly advantageous for the protection of said beads.

It has been found that it is preferable to use a modeling paste with a whole ratio between the polystyrene beads and the binder between 2 and 10 by volume and, preferably, in the vicinity of 4.

In order to improve its game-related nature, it is possible to add various ingredients to this paste and improve its visual appearance or even its odor using, e.g., coloring agents, perfumes, etc.

The present invention also relates to a process for manufacturing a modeling paste as defined above, consisting of:

a) mixing the constituents of said binder in the presence of water (preferably hot water) so as to obtain said binder in the form of a compact paste, b) incorporating said paste in a mixer whose blades turn at high speed, containing an appropriate quantity of expanded polystyrene beads, so as to form a homogeneous mixture of the two components, c) introducing said mixture into a compressor so as to recover a compacted paste, d) forming said compact paste and possibly packaging it.

The blades of the mixer preferably turn a speed between 800 and 1200 rpm.

According to a particularly advantageous variant of the process according to the invention, this is done continuously, and step c consists of introducing said mixture into a screw-type extruding machine and then cutting up the product at the outlet of the extruding machine.

Said continuous process will be better understood with the help of the following description which is illustrated by a single FIGURE attached to the description.

The FIGURE represents a diagrammatic view in cross-section of the device, allowing the implementation of the continuous process according to the invention.

The following composition 1:

| hot water | 1 liter |
|---|---|
| propylparaben | 1 to 5 grams |
| xanthan gum | 20 to 30 grams |
| polyvinyl acetate | 20 to 40 grams |
| polyvinyl alcohol | 90 to 150 grams |
| glycerin | 25 to 75 grams |
| borax | 30 to 40 grams | and preferably:

| hot water | 1 liter |
|---|---|
| propylparaben | 3 grams |
| xanthan gum | 25 grams |
| polyvinyl acetate | 30 grams |
| polyvinyl alcohol | 120 grams |
| glycerin | 50 grams |

-continued

| borax | 35 grams |
|---|---| is poured in mixer 2 in which four liters of expanded polystyrene beads 5 are stirred at high speed (1000 rpm) by blade 3 turning around axle 4. The compact paste formed by the composition of binders is chopped into small pieces and forms a homogeneous mixture with the beads.

This homogeneous mixture 6 is emptied through outlet 7 of the mixer and introduced into screw-type extruding machine 8 through entrance 9. The extruding machine allows one to again obtain a compact homogeneous paste, and the sausage-shaped material 10 emptied at outlet 11 of the extruding machine is then cut up 12 in a suitable manner and then packaged (not shown).

I claim:

1. A modeling paste comprising a matrix which is a mixture of a hydrophilic solid gel and a polyvinyl base cross-linked by di-sodium tetraborate, and expanded elastomeric beads dispersed throughout said matrix.

2. The modeling paste of claim 1 in which said polyvinyl base consists of polyvinyl acetate and polyvinyl alcohol in which the ratio of polyvinyl acetate to polyvinyl alcohol is in the range of 2:9 to 4:15 by weight.

3. The modeling paste of claim 1 characterized in that the hydrophilic solid gel is formed by a polysaccharide gum.

4. The modeling paste of claim 3 in which said polysaccharide gum is a xanthan gum.

5. The modeling paste of claim 3 in which said polysaccharide gum is solidified by cross-linked polyvinyl bases.

6. The modeling paste of claim 1 further including a glycerin plasticizer.

7. The modeling paste of claim 1 in which said expanded elastomeric beads are expanded polystyrene beads having a diameter between approximately 1 and 2 millimeters.

8. The modeling paste of claim 1 in which said elastomeric beads are expanded polystyrene beads and that the ratio by volume of the polystyrene beads relative to the matrix is between 2 and 10.

9. The modeling paste of claim 8 in which the ratio by volume of polystyrene beads relative to matrix is in the vicinity of 4.

10. A method of manufacturing a modeling paste comprising a matrix, which is a mixture of a hydrophilic solid gel and a polyvinyl base cross-linked by di-sodium tetraborate, and expanded elastomeric beads dispersed throughout said matrix, including the steps of:

a) mixing said hydrophilic solid gel, polyvinyl base and di-sodium tetraborate in water to obtain said matrix in the form of a paste, b) forming a homogenous mixture of said matrix and said expanded elastomeric beads in a high-speed blade mixer, and c) compressing said homogenous mixture into a compacted paste.

11. The method of claim 10 in which said matrix has the following composition:

| hot water | 1 liter |
|---|---|
| propylparaben | 1 to 5 grams |
| xanthan gum | 20 to 30 grams |
| polyvinyl acetate | 20 to 40 grams |
| polyvinyl alcohol | 90 to 150 grams |
| glycerin | 25 to 75 grams |
| di-sodium tetraborate | 30 to 40 grams |

* * * * *